United States Patent [19]

Brandt

[11] 4,369,453
[45] Jan. 18, 1983

[54] PLOTTER HAVING A CONCAVE PLATEN

[75] Inventor: Jobst Brandt, Palo Alto, Calif.

[73] Assignee: Hewlett-Packard Company, Palo Alto, Calif.

[21] Appl. No.: 202,846

[22] Filed: Oct. 31, 1980

[51] Int. Cl.³ .............................................. G01D 15/24
[52] U.S. Cl. ..................................... 346/136; 346/114
[58] Field of Search ............... 346/136, 130, 112–120, 346/28, 93

[56] References Cited

U.S. PATENT DOCUMENTS

| 2,805,912 | 9/1957 | Graybeal | 346/112 X |
| 3,650,448 | 3/1972 | Jarmy | 346/136 X |
| 4,038,666 | 7/1977 | Fuller, Jr. | 346/136 |
| 4,168,506 | 9/1979 | Corsover | 346/136 X |
| 4,178,601 | 12/1979 | King | 346/136 X |

FOREIGN PATENT DOCUMENTS 612619  11/1948  United Kingdom ............... 346/112

Primary Examiner—A. D. Pellinen
Assistant Examiner—W. J. Brady
Attorney, Agent, or Firm—Joseph H. Smith

[57] ABSTRACT

A moving-medium XY plotter is provided with a platen which has a concave surface extending uniformly in the direction of pen motion. A drive roller and pinch roller assembly located near the bottom of the concavity provides the motion of the recording medium orthogonal to the pen motion, while at the same time curving the recording medium into the shape of a trough. This curvature stabilizes the motion of the recording medium by significantly enhancing its resistance to compressional buckling and ensures that the recording medium, as a result of its natural stiffness, will firmly contact the platen where writing is to occur.

14 Claims, 4 Drawing Figures

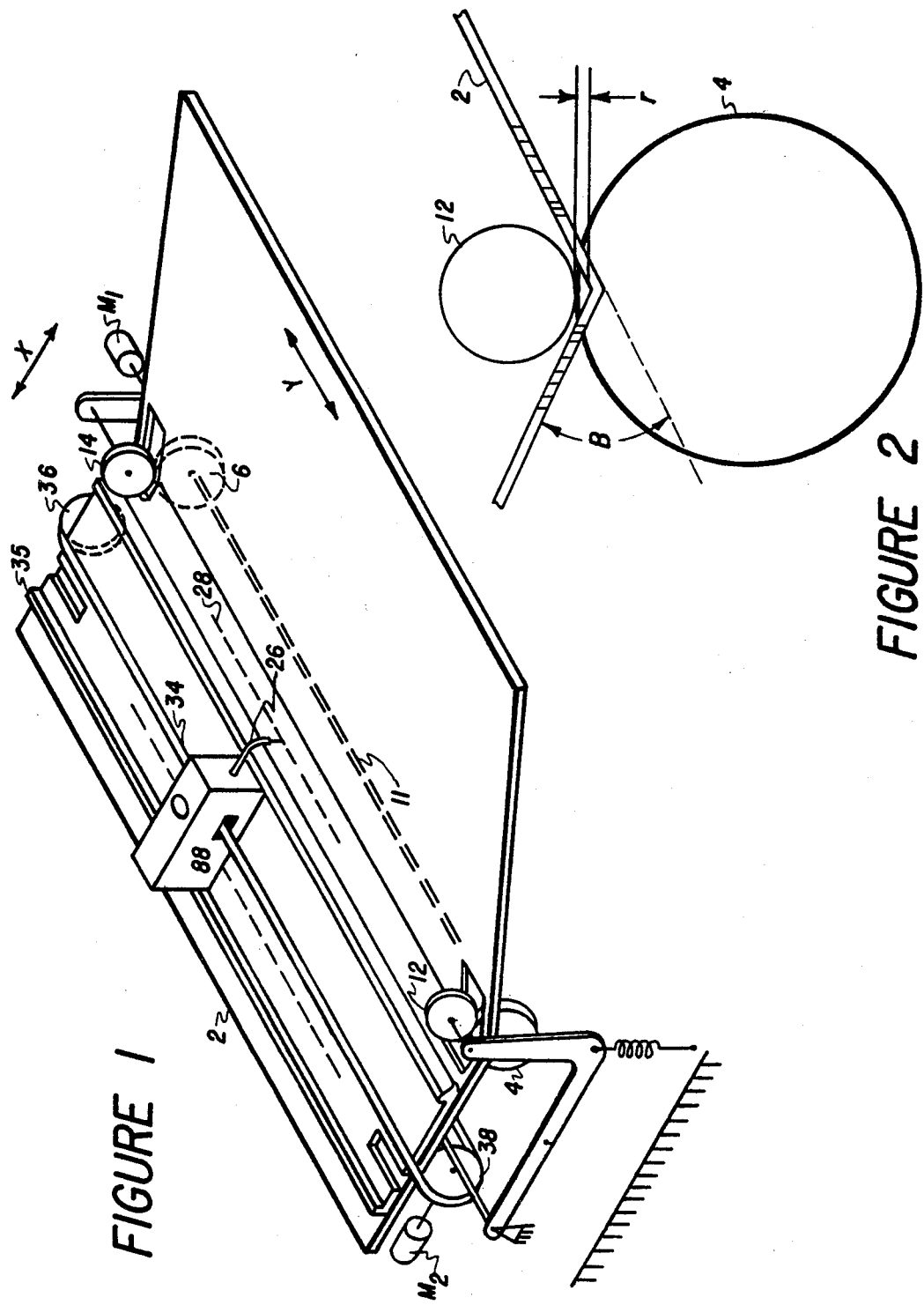

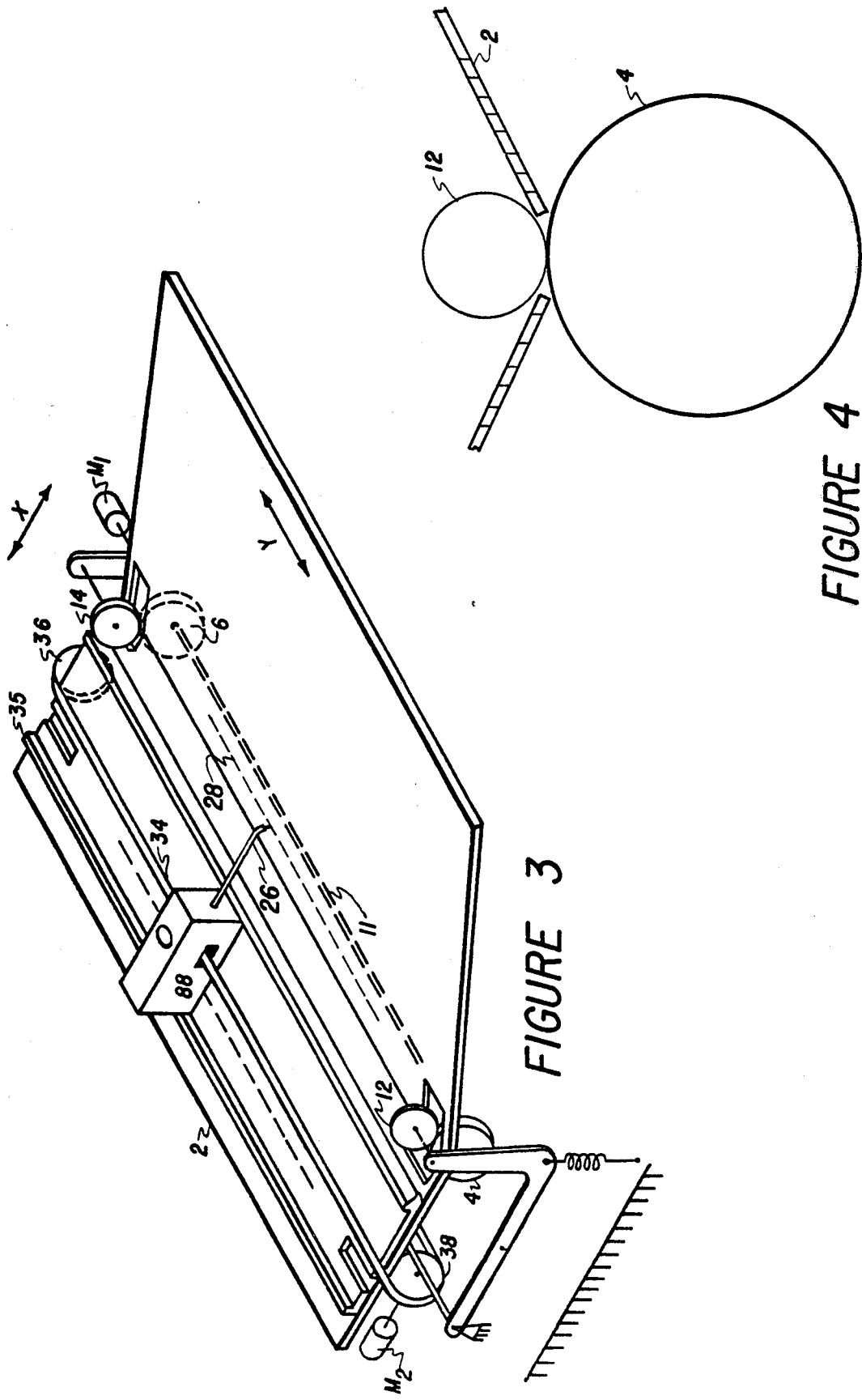

4,369,453

PLOTTER HAVING A CONCAVE PLATEN

BACKGROUND OF THE INVENTION

In moving-medium XY plotters, a sheet of paper or other recording material is moved in an X-direction in accordance with one variable, such as time, and a pen is moved across the material in the orthogonal Y-direction in accordance with the other variable. Often in these systems, the sheet of paper rises at certain points above the plane on which it lies. Generally in these types of plotters there is no mechanism for estimating the vertical location of the paper if the paper does not contact the writing surface, or platen, on which it is to rest. Thus, the pen may not be lifted sufficiently high by the plotter to clear the paper when the pen is moved to a new location in the raised position. The result is that stray lines may be drawn from one location to another. Raising the pen higher to solve this problem significantly increases the plotting time where many pen lifts are required, as in lettering for example.

One solution to this problem is to put the paper over a roller while holding it taut with tension springs, vacuum, or the like, effectively eliminating any paper motion with respect to the roller surface. The problem with such a system is that roller inertia is high, thereby limiting the speed with which the direction of motion of the paper can be changed. Furthermore, engaging the tensioning mechanism is cumbersome and time consuming, and vacuum systems are relatively expensive. Other plotters do not use this large roller concept, but instead draw the sheet of paper across the platen by means of sprockets which engage perforations along the paper's edge. These plotters typically have paper buffers with slack loops on either side of the platen area to maintain the proper paper tension, and a motor driven wheel with which to play out or take up the paper roll as needed. These systems substantially eliminate the problems of large roller inertia but they require control devices for the tensioning, and require a roll medium rather than individual sheets.

BRIEF DESCRIPTION OF THE INVENTION

A moving-medium XY plotter is generally comprised of a drive mechanism for applying forces to the recording medium, or paper, to move it in the X-direction along a flat platen while a moving carriage bearing a pen moves across the platen in the Y-direction.

In accordance with the preferred embodiments of the instant invention, a platen is provided which is not flat but which is, instead, concave relative to the paper and pen, and in the shape of a trough with its axis in the Y-direction. By curving the paper into this trough and bringing it into contact with the platen at both edges near the bottom, it is assured that the paper contacts the platen over the full width of the paper. The pen can then travel at a known elevation above the paper in a selected zone of the trough where the paper is in contact with the platen.

With this system, the need for automatic take-up reels and expensive tension control devices is eliminated. In addition, the invention enables the use of individual sheet media as well as roll media. This makes it possible to reduce the inertia of the paper moving system and to capitalize on the time saved in short pen to paper distances in order to increase plotter speed.

BRIEF DESCRIPTION OF THE DRAWINGS

FIG. 1 is an oblique view of the first preferred embodiment of the invention.

FIG. 2 is an expanded cross-sectional view illustrating the relationship of the roller assembly to the platen.

FIG. 3 is an oblique view of a second preferred embodiment of the invention.

FIG. 4 is an expanded cross-sectional view illustrating a third preferred embodiment of the invention.

DETAILED DESCRIPTION OF THE INVENTION

FIG. 1 illustrates some of the basic relationships between several elements of a device according to the invention. In this preferred embodiment, the platen 2 is concave in the shape of a "V", or trough, extending the width of the recorder in the Y-direction, the width ranging typically from a few inches to a few feet depending on the size of the desired recording medium. The recording medium (not shown) is moved along the surface of the platen 2 by drive rollers 4 and 6 located on opposite sides and near the edges of the platen 2, providing a resultant net motion in the X-direction. Drive rollers 4 and 6 are under the platen 2 and extend through openings in the platen 2 near the deepest point of the "V" to engage pinch rollers 12 and 14, respectively. The drive rollers 4 and 6 are affixed to the shaft 11 (shown as broken lines) of a motor M1, which responds to electrical signals from a control system (not shown).

Drive rollers 4 and 6 in combination with pinch rollers 12 and 14 serve not only to move the recording medium in the X-direction, but also to hold the recording medium near the bottom of the "V", providing some curvature to the recording medium as it traverses the device. The result of this curvature is that the resistance of the recording medium to compressional buckling is significantly enhanced, and the natural stiffness of the recording medium forces it into firm contact with the platen 2 for the full width of the device.

The pen 26 moves across the platen 2 along a line 28 (shown broken) that is parallel to the Y-axis of the recorder and lies in the zone of contact of the recording medium with platen 2. The pen 26 is moved by affixing it to a carriage 88 which glides back and forth in a channel 35 aligned with the Y-axis of the recorder. The carriage 88 is attached to a drive belt 34 which is entrained over a drive wheel 38 and an idler wheel 36, with drive wheel 38 being driven by motor M2 in response to electrical signals from a control system (not shown). The channel 35 is attached to the platen 2 only at the edges with the lower side of channel 35 spaced apart from the platen 2 to permit the recording medium to move thereunder.

FIG. 2 is an expanded cross-sectional view showing the geometry of the drive roller 4 and the pinch roller 12 relative to the platen 2. Keeping in mind that the position of the pinch roller 12 and the drive roller 4 relative to the angled platen 2 is what provides the stabilizing upward curvature of the recording medium, it should be apparent that the distance r of pinch roller 12 above the bottom of the "V", the angle $\beta$ of the platen 2, and the stiffness of the recording medium are closely related to producing the desired performance. The stiffness of the recording medium determines, in large measure, the useable range of values for the radius of curvature of the recording medium at the bottom of the "V". The reason for this is that the radius of curvature must be chosen small enough to ensure that the stress within the recording medium is sufficient to stabilize its shape and to provide firm contact with the platen 2, while at the same time the radius of curvature must not be so small as to result in creasing or permanent deformation of the recording medium from the continual bending beneath the pinch rollers 12 and 14. For example using a relatively stiff material like mylar, instead of paper, generally requires a larger radius of curvature to avoid permanent deformation.

Having chosen an appropriate radius of curvature for the recording medium at the bottom of the "V", it is apparent from the geometry that the distance r and the angle $\beta$ can be varied over a wide range. As the angle $\beta$ is increased, so is the required distance r and vice-versa for the chosen radius of curvature of the recording medium.

In this preferred embodiment, r is typically of the order of 0.5 mm with $\beta$ ranging from approximately 20° to 30°, for commercially available recording media such as dry copying paper. The radius of the drive roller 4 is not critical and can be chosen for convenience to correspond to available materials, fabrication methods, and desired gear ratio. A typical radius for the drive roller 4 ranges from approximately 1 cm to as much as 15 cm for use with standard size plotting papers which are available commercially. The maximum radius of the pinch rollers 12 and 14 is determined by the desired distance r above the bottom of the deepest point of the platen 2 and the angle $\beta$ of the platen 2, so that pinch rollers 12 and 14 will not extend below the surface of the platen 2. It is desirable that pinch rollers 12 and 14 not extend below that point in order not to force the recording medium into an unstable configuration or to crease it along the edges. A typical radius for pinch rollers 12 and 14 ranges from approximately 0.2 cm to as high as 15 cm, depending on the chosen values of r and $\beta$. In this particular embodiment, a radius of 0.5 cm was used for pinch rollers 12 and 14 with r of the order of 0.5 mm and $\beta$ ranging from approximately 20° to 30°.

As is clear from FIG. 2, the symmetry of the platen 2 ensures that the recording medium will contact the platen 2 equally well on either side of the line of symmetry defined by the bottom of the "V". Hence, it is not necessary to restrict the pen contact line 28 to the same side of the platen 2 where the carriage 88 is located. Instead, an equivalent line on the opposite side of the bottom of the "V" can be used as in the embodiment shown in FIG. 3.

Other embodiments will also be apparent to those skilled in the art. For example, it is not necessary that the shape of the platen be a "V". Nearly any concave surface extending uniformly in the Y-direction which together with pinch rollers or some other device that forces the recording medium into a concave shape or trough, such that the recording medium contacts the platen along a line extending in the Y-direction will also accomplish the desired result. Any of the regular conic sections could be used, i.e., the cross-sectional view of the platen looking parallel to the Y-axis would be a trough in the shape of a truncated circle, elipse, parabola, or hyperbola. Although such alternative configurations may provide some advantages over the "V" shape because of the smooth transition from one side of the trough to the other, especially where large recording media are involved (i.e., wide in the Y-direction), these configurations have the present disadvantage of being more difficult to fabricate. Furthermore, there are some indications to suggest that such configurations may require closer tolerances as to the placement of the pinch rollers and drive rollers relative to the surface of the platen. Note, too, that it is only necessary for a portion of the platen to be concave in shape. It may be desirable to provide extensions in the X-direction on the ends of the concave region to provide support to the recording media.

Another variation, as shown in FIG. 4, is a platen bifurcated at the bottom of the "V", for example, to provide more space for wider rollers, for permitting the spacing of the rollers to be changed to accommodate different widths of recording media, to provide space for other devices such as optical equipment for sensing alignment of the recording medium, or to permit variability in platen angle to better accommodate different recording media. Also, in discussing variation of the instant invention, it should be apparent that terms such as "above" or "at the bottom" and the like, have been used to describe the relative orientations of the various elements of the apparatus when it is upright with the X-axis and Y-axis in a horizontal plane relative to the earth. The concept of the invention, however, is not dependent on this orientation. Hence, a device could be fabricated using the principles disclosed herein which could operate equally well in any orientation relative to the earth, provided gravitational effects are properly taken into consideration in the design. Also, it should be noted that the particular pen carriage, pen geometry, and pen drive mechanism are not critical factors in the device as, e.g., the pen may be driven by a screw as opposed to a belt or wire. Further, the number of the various rollers and their location in the Y-direction are not critical factors in the design.

What is claimed is:

1. A plotting apparatus having a first axis and a substantially orthogonal second axis for recording information on a recording medium comprising:

a platen with at least a portion thereof having a concave surface, said concave surface having a constant geometric cross sectional configuration in all planes perpendicular to the second axis for at least the width of the recording medium in the direction of the second axis;

drive means adjacent to said concave surface for providing motion of the recording medium in the direction of the first axis;

image means mounted for mobility in the direction of the second axis for creating a selected image on the recording medium;

hold-down means located in close proximity to the platen in said portion of the concave surface with constant geometric cross-sectional configuration for bending the recording medium into the shape of a trough extending in the direction of the second axis within the concavity of the concave surface to utilize the internal stress of the recording medium resulting from said bending to cause the recording medium to contact the platen in a zone extending across the platen for the width of the recording medium in the direction of the second axis.

2. A plotting apparatus in claim 1 wherein said drive means is located proximately to a line in the direction of the second axis defined by the locus of points of the minimum radius of curvature of the recording medium in the concavity of the concave surface.

3. A plotting apparatus as in claim 2 wherein both said hold-down means and said drive means are comprised of a plurality of rollers and said rollers of said hold-down means are located opposite said rollers of said drive means for the recording medium to move therebetween.

4. A plotting apparatus as in claim 3 wherein said concave surface of said platen is in the shape of the letter V extending in the direction of the second axis.

5. A plotting apparatus having a first axis and a substantially orthogonal second axis for recording information on a recording medium comprising:
   a platen with at least a portion thereof having a concave surface, at least a portion of said concave surface having a constant geometric cross-sectional configuration in all planes perpendicular to the second axis for a least the width of the recording medium in the direction of the second axis;
   drive means adjacent to said concave surface for providing motion of the recording medium in the direction of the first axis without the use of tensioning devices; and
   image means mounted for mobility in the direction of the second axis for creating a selected image on the recording medium.

6. A plotting apparatus as in claim 3 further comprising a hold-down means located in close proximity to the platen in said portion of the concave surface with constant geometric cross-sectional configuration for bending the recording medium into the shape of a trough extending in the direction of the second axis within the concavity of the concave surface to utilize the internal stress of the recording medium resulting from said bending to cause the recording medium to contact the platen in a zone extending across the platen for the width of the recording medium in the direction of the second axis.

7. A plotting apparatus as in claim 6 wherein said drive means is located proximately to a line in the direction of the second axis defined by the locus of points of the minimum radius of curvature of the recording medium in the concavity of the concave surface.

8. A plotting apparatus as in claim 7 wherein both said hold-down means and said drive means are comprised of a plurality of rollers, said rollers of said hold-down means located opposite said rollers of said drive means for the recording medium to move therebetween.

9. A plotting apparatus as in claim 8 wherein said concave surface of said platen is in the shape of the letter V extending in the direction of the second axis.

10. A plotting apparaus having a first axis and a substantially orthogonal second axis for recording information on a recording medium comprising:
    a platen with at least a portion thereof having a concave surface, said concave surface having a constant geometric cross sectional configuration in all planes perpendicular to the second axis for at least the width of the recording medium in the direction of the second axis;
    drive means adjacent to said concave surface for providing motion of the recording medium in the direction of the first axis;
    image means mounted for mobility in the direction of the second axis for creating a selected image on the recording medium; and
    bending means located in close proximity to the platen in said portion of the concave surface with constant geometric cross-sectional configuration for bending the recording medium into the shape of a trough extending in the direction of the second axis within the concavity of the concave surface to utilize the internal stress of the reording medium resulting from said bending to resist compressional buckling of the recording medium as the recording medium is moved by said drive means.

11. A plotting apparatus as in claim 10 wherein said bending means comprises hold-down means for holding the recording medium in contact with the platen in a zone extending across the platen for the width of the recording medium in the direction of the second axis.

12. A plotting apparatus as in claim 11 wherein said drive means is located proximately to a line in the direction of the second axis defined by the locus of points of the minimum radius of curvature of the recording medium in the concavity of the concave surface.

13. A plotting apparatus as in claim 12 wherein both said hold-down means and said drive means are comprised of a plurality of rollers, said rollers of said hold-down means located opposite said rollers of said drive means for the recording medium to move therebetween.

14. A plotting apparatus as in claim 13 wherein said concave surface of said platen is in the shape of the letter V extending in the direction of the second axis.

* * * * *